United States Patent Office 2,836,590
Patented May 27, 1958

2,836,590

METHOD FOR PARTIAL DEACYLATION OF ORGANIC ACID ESTERS OF CELLULOSE

Harry W. Turner, Wilmington, Del., assignor to Hercules Powder Company, Wilmington, Del., a corporation of Delaware No Drawing. Application May 5, 1955
Serial No. 506,361

11 Claims. (Cl. 260—230)

This invention relates to the treatment of organic acid esters of cellulose. More particularly this invention relates to a new method for the partial deacylation of organic acid esters of cellulose.

The commercial preparation of organic acid esters of cellulose, such as cellulose acetate, for example, involves the complete acylation of cellulose, generally in the presence of an acid catalyst such as sulfuric acid, followed, usually, by partial deacylation or ripening to impart desirable solubility characteristics to the cellulose ester.

Cellulose esters made in the presence of sulfuric acid almost invariably contain a certain amount of combined sulfate groups which reduces their stability so that on molding they tend to become discolored and often also to undergo degradation resulting in a substantial reduction in viscosity. Some combined sulfate is usually split off in the ripening operation and is removed in the subsequent precipitation and washing steps, but a certain amount usually remains so that it is necessary to subject the cellulose ester, either before or after it has been washed, to a stabilizing operation by means of which the greater part of the remaining combined sulfate content is split off and removed.

While many ripening procedures have been proposed and are in use, particularly as a necessary adjunct to the customary solution processes for preparing secondary organic acid esters of cellulose, experience has shown that the solubility properties and stability of the end product depend, to a large extent, on the manner in which the deacylation or ripening and subsequent stabilization are carried out. It is well recognized that the processes heretofore proposed have certain limitations which have led to the diversity of processes now considered conventional. Moreover, no really satisfactory deacylation or stabilization of organic acid esters of cellulose prepared by fibrous acylation processes have ever been proposed.

Accordingly, it is the principal object of this invention to provide a new method for the partial deacylation of organic acid esters of cellulose having great diversity for removing the limitations heretofore existent. Among the objectives accomplished in accordance with this invention are the following:

Provision of a method for partial deacylation of organic acid esters of cellulose prepared by either solution or fibrous acylation;

Provision of a method for partial deacylation of organic acid esters of cellulose in either the fully acylated or primary state of esterification, or as secondary esters prepared by a previous ripening process;

Provision of a method for partial deacylation of organic acid esters of cellulose which effectively removes a substantial proportion of combined sulfate ester groups;

Provision of a method for partial deacylation of organic acid esters of cellulose which provides products of improved stability without the necessity to resort to subsequent stabilization treatment. Other objects of the invention will appear hereinafter, the novel features and combinations being set forth in the appended claims.

Generally described, the present invention comprises heating particulate organic acid ester of cellulose with a liquid consisting of an alcohol in the substantial initial absence of free acid to a temperature of at least about 180° C. and sufficient to cause said ester to dissolve in said alcohol, maintaining the cellulose ester in solution in the alcohol at a temperature of at least about 180° C. until the desired degree of partial deacylation is attained, and recovering the partially deacylated cellulose ester from the alcohol solution.

In accordance with one embodiment of this invention, a cellulose ester in particulate form, such as flake, fibers, or powder, is mixed with about 5 to 20 parts of an alcohol per part of cellulose ester by weight and is heated to a temperature of at least about 180° C. and sufficient to cause the cellulose ester to dissolve in the alcohol. Heating of the solution thus formed is then continued at a temperature of at least about 180° C. until the desired degree of deacylation is obtained. The solution is then cooled, whereupon the deacylated cellulose ester product precipitates from the solution, and is readily recovered by draining, washing, and drying. When alcohols of low boiling point such as methanol, ethanol, butanol or the like are employed, the reaction must be conducted in a sealed pressure vessel. However, the process can be conducted at substantially atmospheric pressure when an alcohol of high boiling point such as octyl alcohol, ethylene glycol, diethylene glycol, and the like are employed.

It has been found that when the cellulose ester contains combined sulfate groups in the free acid form the process of this invention effects a substantial removal of such sulfate groups. From all indications removal of such combined sulfate groups is accomplished early in the process. The process of this invention can, therefore, be employed to advantage to effect stabilization of cellulose esters. From the foregoing discussion, it will be apparent that deacylation as employed in the specification and claims is intended to include the removal from the cellulose ester not only of organic acid radicals but also other combined acid radicals such as combined sulfate radicals. Deacylation may, therefore, involve removal from the cellulose ester of both combined sulfate and organic acid radicals, or removal of organic acid radicals alone when other combined acid radicals such as combined sulfate are absent from the starting cellulose ester. The nature of the starting cellulose ester and the object to be achieved will goven largely which of the above deacylation variations is to be accomplished by this invention.

The general nature of the invention having been set forth, the following examples are persented in specific illustration but not in limitation thereof.

*Example 1*

In each of four separate runs, 5 grams of a fibrous completely substituted primary cellulose triacetate substantially free of uncombined acid and also free of sulfate ester groups was heated together with 50 ml. of anhydrous ethyl alcohol for 4 hours in a sealed pressure vessel. The temperatures employed in the four runs were respectively, 150°, 180°, 205° and 230° C. At 150° C. and at 180° C. the cellulose triacetate did not dissolve in the ethyl alcohol, and substantially no deacetylation took place. The recovered product in these two runs had the same fibrous form as the starting cellulose triacetate. At 205° C. and at 230° C., however, the cellulose triacetate dissolved in the ethyl alcohol, and upon cooling the alcohol solution, the cellulose acetate product separated as an amorphous powder. Analysis indicated that the product of the 205° C. run contained 60.47% combined acetic acid. This product was insoluble in acetone. The product of the 230° C. run contained 54.23% combined acetic acid and was soluble in acetone.

Example 2

Employing the same cellulose triacetate set forth in Example 1, four separate runs were made employing a different alcohol in each run. In each run, 5 grams of the fibrous completely substitued primary cellulose triacetate substantially free of uncombined acid and also free of sulfate ester groups was heated together with 50 ml. of the anhydrous alcohol for 4 hours at 230° C. in a sealed pressure vessel. In each run the cellulose acetate dissolved in the alcohol under the temperature and pressure conditions employed, and upon cooling the alcohol solution the cellulose acetate precipitated and was recovered as a fine powder. Analysis of the products obtained for percent combined acetic acid content gave the following results:

| Alcohol Employed | Combined Acetic Acid Content of Product, Percent |
| --- | --- |
| Methanol | 2.99 |
| Ethanol | 54.23 |
| Isopropanol | 62.17 |
| Monoethyl ether of ethylene glycol | 36.42 |

Example 3

In this example a series of runs was made to determine how time and temperature affect the deacetylation reaction when cellulose acetate is added to hot ethylene glycol. In each run 25 grams of a cellulose acetate containing 59.65% by weight of combined acetic acid was added to 417 ml. of ethylene glycol heated to a predetermined temperature and the mixture was stirred vigorously while maintaining the temperature. At regular intervals after addition of the cellulose acetate to the hot ethylene glycol, aliquots of reaction mixture were removed, and the cellulose acetate was precipitated by quenching each aliquot in a large volume of methanol. The cellulose acetate products obtained in this manner were examined for combined acetic acid content and for acetone solubility. Owing to the characteristic of ethylene glycol to superheat without appreciable ebullition, all runs, including those at 210° C. and 220° C. were conducted at atmospheric pressure, a reflux condenser being employed at the higher temperatures.

At temperatures of 190° C. and above the cellulose acetate quickly dissolved in the hot ethylene glycol to form a homogeneous solution. Cellulose acetate products having 53±1% combined acetic acid content were all soluble in acetone. The following table sets forth pertinent data with respect to time of reaction, temperature of ethylene glycol, and combined acetic acid content of the products obtained.

| Time of Reaction (Minutes) | Temperature of Ethylene Glycol | | | | | |
| --- | --- | --- | --- | --- | --- | --- |
| | 160° C. | 180° C. | 190° C. | 196° C. | 210° C. | 220° C. |
| 0 | [1] 59.65 | 59.65 | 59.65 | 59.65 | 59.65 | 59.65 |
| 30 | | | | 58.08 | 57.15 | 56.54 |
| 60 | 59.66 | 59.16 | 58.23 | 57.68 | 55.69 | 54.61 |
| 90 | | | 57.05 | 56.12 | 53.51 | 53.30 |
| 120 | 59.48 | 58.75 | 56.25 | 54.79 | 51.28 | 49.58 |
| 150 | | | 55.40 | 53.67 | 48.27 | 43.51 |
| 180 | 59.51 | 57.71 | 54.17 | 52.29 | 43.82 | 36.69 |

[1] Percent by weight combined acetic acid.

Example 4

A commercial cellulose acetate having 55.30% by weight combined acetic acid content, an intrinsic viscosity in 9:1 methylene chloride: ethanol by weight of 1.56 and a combined sulfate content of 0.0094% was treated by cation exchange technique to remove neutralizing cations attached to the combined sulfate groups in the cellulose acetate. Thirty-five grams of this cellulose acetate, after the above deashing treatment my cation exchange, was heated with 584 ml. of ethylene glycol at 210° C. and at atmospheric pressure under a reflux condenser for 15 minutes. The cellulose acetate quickly dissolved in the hot ethylene glycol to form a homogeneous solution, and upon cooling the solution the cellulose acetate reprecipitated and was recovered. The recovered cellulose acetate showed 52.67% combined acetic acid content, an intrinsic viscosity in 9:1 methylene chloride: ethanol by weight of 1.52, and a combined sulfate content of 0.0011%. A plastic disk molded from this treated cellulose acetate was almost colorless (6 CSCS units), whereas a similar plastic disk formed with the original cellulose acetate after deashing was markedly discolored (18 CSCS units).

Example 5

A deashed cellulose triacetate product substantially free of uncombined acid, containing 60.17% by weight of combined acetic acid, and containing combined sulfate groups in an unneutralized state, with a cuprammonium intrinsic viscosity of 2.00, was employed in this example. Twenty-five grams of this cellulose acetate was stirred with 417 ml. of ethylene glycol heated to 210° C. and maintained at this temperature. The cellulose acetate quickly dissolved in the hot ethylene glycol to form a homogeneous solution. After maintaining the solution at 210° C. for approximately 30 minutes, 0.25 gram of calcium carbonate was added to the clear solution to neutralize liberated acid, principally sulfuric acid derived from the combined sulfate groups, after which heating and stirring were continued for an additional 60 minutes. The glycol solution of cellulose acetate was then quickly cooled, thus causing the cellulose acetate to precipitate as a fine powder. The precipitated cellulose acetate was filtered from the glycol liquor and was then exhaustively washed with methanol and dried. The recovered cellulose acetate product contained 49.71% by weight combined acetic acid, and had a cuprammonium intrinsic viscosity of 1.80. The deacetylated product upon molding formed a plastic disc that was substantially free of color.

The process of this invention is applicable for the partial deacylation of any organic acid ester of cellulose, including by way of example, cellulose acetate, cellulose propionate, cellulose butyrate, cellulose crotonate, cellulose benzoate, cellulose phthalate, cellulose acetate propionate, cellulose acetate butyrate, cellulose acetate crotonate, cellulose acetate sorbate, cellulose acetate phthalate, and the like. It is particularly valuable for the partial deacylation of the lower fatty acid esters of cellulose, and finds especially useful application for the partial deacylation of various cellulose acetate products, irrespective of the method of acetylation and/or subsequent ripening or stabilization treatment employed to prepare the cellulose acetate. For example, the process of this invention has been employed with primary or fully acetylated cellulose prepared by customary solution processes to effect substantial removal of combined sulfate groups and partial removal of combined acetic acid radicals to prepare a secondary cellulose acetate of greatly improved stability. The process of this invention has been similarly employed with primary or fully acetylated cellulose ester prepared by a nonsolution or fibrous method of acetylation to prepare a secondary acetate of greatly improved stability.

According to this invention the cellulose ester should be in solid form, and should be free of uncombined acid, either organic or inorganic in nature. Preferably the cellulose ester should be in particulate form, such as flake, granules, fibers, powder, and the like. Free acid, either organic or inorganic in nature, is undesirable.

Accordingly, any free acidity is removed from the cellulose ester either by washing or by a combination of neutralization and washing prior to the deacylation process of this invention.

Moreover, acid catalysts such as sulfuric acid, for example, are not employed in the deacylation process of this invention.

A necessary feature of this invention involves heating the cellulose ester with an alcohol in the substantial initial absence of free acid to a temperature of at least 180° C. and sufficient to cause the cellulose ester to dissolve in the alcohol. In other words, the deacylation process of this invention requires that the cellulose ester must be dissolved in the alcohol, and also requires that the temperature of the resulting solution must be at least about 180° C. Below about 180° C. substantially no deacylation takes place. Also, substantially no deacylation takes place if the cellulose ester is not dissolved in the alcohol. Temperatures above about 250° C. are not desirable from a practical consideration because such temperatures are likely to cause undesirable degradation of the cellulose ester molecule and reaction rate becomes too rapid to afford close control of the process. Temperatures between about 190° C. and 230° C. are preferred.

Any aliphatic or cycloaliphatic alcohol is suitable for the purposes of this invention, such as by way of example, methanol, ethanol, propanol, butanol, hexanol, octanol, decanol, dodecanol, and the like in any of their isomeric forms; cycloaliphatic alcohols and alkyl-substituted cycloaliphatic alcohols such as cyclopentanol, methyl cyclopentanol, ethyl cyclopentanol, cyclohexanol, methyl cyclohexanol, ethyl cyclohexanol, and the like; polyhydric alcohols such as ethylene glycol, diethylene glycol, propylene glycol, glycerol, and the like; monoalkylated ethers of polyhydric alcohols such as monomethyl ether of ethylene glycol, monoethyl ether of ethylene glycol, monobutyl ether of ethylene glycol, and the like. Preferably the alcohol should be saturated to avoid possible undesirable polymerization reactions.

The alcohol is not diluted with any other organic liquid. Although it is presently believed that the amount of alcohol employed has little if any influence on the rate or extent of the deacylation reaction, from practical considerations sufficient alcohol should be employed to form a flowable solution with the cellulose ester. This will vary somewhat depending upon the degree of substitution and degree of polymerization of the cellulose ester and upon the particular alcohol selected. Generally, however, at least about 5 parts of alcohol per part of cellulose ester by weight is desirable, and preferably between 10 and 20 parts alcohol per part of cellulose ester. More than 20 parts of alcohol can be employed, if desired, however. Alcohols having boiling points below 180° C. require employment of a sealed pressure vessel in practicing the invention. In these cases the pressure developed will be the autogenous pressure determined by the particular alcohol and temperature selected. However, alcohols having boiling points above or in the neighborhood of 180° C. can be employed at substantially atmospheric pressure.

The term "alcohol" as employed herein and in the claims is intended to include not only anhydrous alcohols, but also alcohols containing up to 20% of water, since all such alcoholic liquids have been found to effect deacylation in accordance with this invention. However, anhydrous alcohols, or substantially anhydrous alcoholic liquids containing traces of water, up to about 1% or 2% of water, are preferred for the purposes of this invention, since it has been observed that some degradation of the cellulose ester is likely to be encountered when alcoholic liquids containing substantial quantities of water, such as 10% or 20%, are employed.

Although the process of this invention should be initiated in the substantial initial absence of free acid, particularly in the absence of free acids, such as sulfuric acid, which are customarily employed as catalysts in the ripening of cellulose esters, it will be understood that some free acid is developed as the deacylation process proceeds. When such free acid consists substantially entirely of organic acid, it is generally unnecessary to take any measures to remove or neutralize such acid during the course of the deacylation reaction. However, when the cellulose ester contains combined sulfate groups or similar unstabilizing acid groups which are split off during the deacylation process of this invention, it is desirable to neutralize such acid groups to avoid degradation of the cellulose ester molecule. This is readily accomplished with a small amount of an alkaline earth carbonate or bicarbonate, such as magnesium or calcium carbonate or bicarbonate, substantially equivalent to the sulfate groups or similar acid groups liberated in the process.

The cellulose ester is maintained in solution in the alcohol at a temperature of at least about 180° C. until the desired degree of partial deacylation is attained. The course of the reaction can be readily determined by taking samples of the solution as the reaction proceeds, precipitating the cellulose ester therefrom, and determining the solubility characteristics of the product in the desired solvent, acetone, for example. This is the customary procedure in the art for following ripening operations.

If desired, conventional stability tests also can be employed, either in place of, or as a supplement to, solubility tests to follow the course of the deacylation reaction. Stability tests are particularly of value in following the course of removal of combined sulfate groups, for stability progressively improves with progressive removal of such groups from the cellulose ester.

As soon as the desired degree of partial deacylation is attained, as determined by solubility tests and/or stability tests, the partially deacylated product is recovered from the alcohol solution, and it is then washed and otherwise treated as desired and finally dried. Cooling the alcohol solution following the partial deacylation reaction causes the cellulose ester product to precipitate, and the precipitated product is readily recovered by draining off the alcohol liquor. Subsequent treatment of the product, such as washing, bleaching, drying, and the like, follow conventional practice in the art.

From the foregoing description, it will be apparent that the advantages of the invention are multifold. The principal advantage resides in the attainment of the objectives as hereinbefore set forth in providing a novel and versatile partial deacylation process generally applicable without restriction to all organic acid esters of cellulose.

What I claim and desire to protect by Letters Patent is:

1. In a process for the partial deacylation of an organic acid ester of cellulose by alcoholysis, the improvement which comprises heating said cellulose ester in particulate form with a liquid consisting of an alcohol in the substantial initial absence of free acid to a temperature of at least about 180° C. and sufficient to cause said ester to dissolve in said alcohol, maintaining the cellulose ester in solution in the alcohol at a temperature of at least about 180° C. until the desired degree of partial deacylation is attained, and recovering the partially deacylated cellulose ester from the alcohol solution.

2. A process in accordance with claim 1 wherein the organic acid ester of cellulose is a lower fatty acid ester of cellulose.

3. A process in accordance with claim 1 wherein the organic acid ester of cellulose is cellulose acetate.

4. In a process for the partial deacylation of an organic acid ester of cellulose by alcoholysis, the improvement which comprises heating said cellulose ester in particulate form with a liquid consisting of an alcohol in a sealed pressure vessel in the substantial initial absence of free acid to a temperature of at least about 180° C. and sufficient to cause said ester to dissolve in said alcohol, maintaining the cellulose ester in solution in the alcohol at a temperature of at least about 180° C. until the desired degree of partial deacylation is attained, cooling the alcohol solution to precipitate the partially deacylated cellulose ester thus formed, and recovering the partially deacylated cellulose ester.

5. The process in accordance with claim 4 wherein the alcohol is methanol.

6. The process in accordance with claim 4 wherein the alcohol is ethanol.

7. The process in accordance with claim 4 wherein the alcohol is isopropanol.

8. The process in accordance with claim 4 wherein the alcohol is cyclohexanol.

9. The process in accordance with claim 4 wherein the alcohol is the monoethyl ether of ethylene glycol.

10. In a process for the partial deacylation of an organic acid ester of cellulose by alcoholysis, the improvement which comprises heating said cellulose ester in particulate form at substantially atmospheric pressure and in the substantial initial absence of free acid with a liquid consisting of an alcohol having a boiling point above about 180° C. to a temperature of at least about 180° C. and sufficient to cause said ester to dissolve in said alcohol, maintaining the cellulose ester in solution in the alcohol at a temperature of at least about 180° C. until the desired degree of partial deacylation is attained, cooling the alcohol solution to precipitate the partially deacylated cellulose thus formed, and recovering the partially deacylated cellulose ester.

11. The process in accordance with claim 10 wherein the alcohol is ethylene glycol.

References Cited in the file of this patent

UNITED STATES PATENTS

| 2,121,899 | Auden et al. | June 28, 1938 |
| 2,607,771 | Groombridge et al. | Aug. 19, 1952 |
| 2,680,693 | Groombridge et al. | June 8, 1954 |

FOREIGN PATENTS

| 433,785 | Great Britain | Jan. 8, 1935 |
| 459,820 | Great Britain | Jan. 15, 1937 |